Patented May 28, 1946

2,401,261

UNITED STATES PATENT OFFICE 2,401,261

ESTERS OF PENTAHALOPHENOXY-ALKANOLS

Clinton W. MacMullen, Syracuse, N. Y., assignor to Rohm & Haas Company, Philadelphia, Pa., a corporation of Delaware No Drawing. Application March 18, 1944, Serial No. 527,152

9 Claims. (Cl. 260—488)

This invention relates to new compounds of the general formula

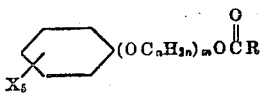

wherein X represents the halogens, chlorine and/or bromine, $n$ represents an integer from two to three, inclusive, $m$ represents an integer from one to three, inclusive, and R represents hydrogen or a monovalent radical of the aliphatic and arylaliphatic series.

The esters of the above formula are useful as fungicides, particularly for preventing the mildewing of textile fabrics. They are effective at relatively low concentrations for such purposes and are innocuous on the human skin. A fabric impregnated with one of the compounds of this invention remains mildewproof even after a use wherein leaching in water may be involved.

The pentahalophenoxyalkyl esters may be prepared from the corresponding alcohols and acids by an esterification reaction or by reaction of an acid halide and corresponding alcohol or of a halide corresponding to such an alcohol and a salt of the acid or by other acylation reaction.

There may be used alcohols such as pentachlorophenoxyethanol, pentabromophenoxyethanol, pentachlorophenoxyethoxyethanol, pentachlorophenoxyethoxyethoxyethanol, pentabromophenoxypropanol-1 or -2, etc., for direct esterification, or the corresponding derivatives in which the hydroxyl group is replaced with a halogen, such as chlorine, bromine, or iodine.

Suitable acids for the esterification include formic, acetic, chloracetic, propionic, β-chloropropionic, butyric, isobutyric, valeric, lauric, myristic, stearic, acrylic, methacrylic, crotonic, cinnamic, undecylenic, oleic, phenylacetic, phenoxyacetic, and other aliphatic or arylaliphatic acid, whether straight or branched chained, saturated or unsaturated. Where available, corresponding anhydrides may be used, or salts of the acids, or their acid halides. Thus, R in the above formula may be any monovalent aliphatic or arylaliphatic radical or hydrogen (in the case of formic acid).

The preparation of the alcohols which may be used in the esterification is described in copending application Serial No. 527,151, filed of even date. The halides corresponding to these alcohols may be formed from pentahalophenol or pentahalophenate and a dihalide.

The preferred class of the esters of this invention is that having only one oxyalkyl group, and in this class the esters of saturated aliphatic acids are generally the most desirable.

The following examples illustrate the preparation of the esters of this invention.

Example 1

(a) 1066 parts of pentachlorophenol was placed in an autoclave and heated to 100°–150° C. while 284 parts of ethylene oxide was run in over a period of three hours. The gauge pressure rose to 110 pounds per square inch and fell to zero at the end of the reaction. The reaction mixture was removed and washed with 5% sodium hydroxide solution. It was then dissolved in 1200 parts of ethyl alcohol and the resulting solution filtered. To the filtrate 550 parts of water was added and crystals separated on colling. These were recrystallized from 60% alcohol to give a product melting at 90.5°–92.5° C. This product was pentachlorophenoxyethanol,

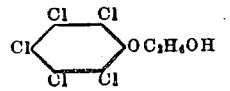

(b) A mixture of 310 parts of pentachlorophenoxyethanol prepared as in part (a) above, 160 parts of benzene, 37 parts of fused sodium acetate, and 107 parts of acetic anhydride was stirred for four hours at 95° C. The reaction mixture was treated with water. An oil layer was separated and was washed with dilute Na₂CO₃ solution and then with water. It was distilled at 171°–173° C./1 mm. The distillate solidified and was recrystallized from naphtha. The crystals had a melting point of 79°–80° C. The product was pentachlorophenoxyethyl acetate,

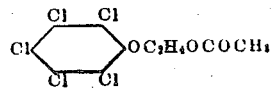

Analysis: Chlorine found, 50.23%.
Chlorine calculated for $C_{10}H_7O_3Cl_5$, 50.35%.

Example 2

(a) A mixture of 288 parts of sodium pentachlorophenate, 7 parts of sodium hydroxide, 50 parts of water, and 1144 parts of 2,2′-dichlorodiethyl ether was stirred under reflux at 110°–112° C. for sixteen hours. The resulting oily product was washed with water and distilled at 171°–181° C./2 mm. The distillate solidified and was recrystallized from petroleum ether having a boiling range of 40°–60° C. The crystals had a melting point of 47°–50° C. and corresponded in composition to pentachlorophenoxyethoxyethyl chloride,

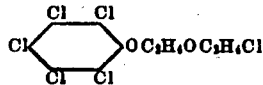

(b) A mixture of 51 parts of pentachlorophenoxyethoxyethyl chloride prepared as above, 20 parts of potassium acetate, and 25 parts of glacial acetic acid was stirred for twenty-four hours at 160°–184° C. The reaction mixture was treated with water and the product was extracted with toluene. The toluene solution was separated, dried, and distilled. The desired product came over at 191°–199° C./1 mm. The distillate solidified and was recrystallized from ligroin, giving crystals having a melting point of 63°–66° C. The product was pentachlorophenoxyethoxyethyl acetate,

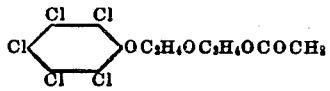

Analysis: Chlorine found, 45.51%.
Theory for chlorine in $C_{12}H_{11}O_4Cl_5$, 44.77%.

*Example 3*

(a) A mixture of 576 parts of sodium pentachlorophenate, 16 parts of sodium hydroxide, 100 parts of water, and 2244 parts of triglycol dichloride was refluxed for twenty-one hours at 110°–115° C. The product was washed with water and distilled, the fraction boiling at 228°–236° C./2 mm. containing the desired compound. The distillate solidified to a crystalline product which had a melting point of 40.5°–43.5° C. and was pentachlorophenoxyethoxyethoxyethyl chloride,

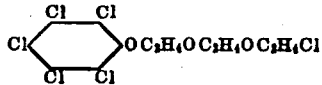

(b) 417 parts of pentachlorophenoxyethoxyethoxyethyl chloride, prepared as above, 140 parts of potassium acetate, and 210 parts of glacial acetic acid were stirred for twenty-four hours at 154°–180° C. The reaction mixture was treated with water, and the desired product was extracted with toluene. The toluene solution was separated, washed with dilute sodium hydroxide, and then distilled. The fraction boiling at 205°–241° C./1 mm. was a pale yellow oil, pentachlorophenoxyethoxyethoxyethyl acetate,

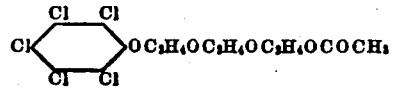

Analysis: Chlorine found, 39.4%.
Theory for chlorine in $C_{14}H_{15}O_5Cl_5$, 40.29%.

*Example 4*

A mixture of 310 parts of pentachlorophenoxyethanol, prepared as in Example 1, 200 parts of methyl methacrylate, 5 parts of di-β-naphthol, and 5 parts of 98% sulfuric acid was placed in a flask equipped with a mechanical stirrer and a packed fractionating column, two feet high. The mixture was stirred and heated for five hours at 108°–138° C., during which time methanol was distilled off through the fractionating column. Toluene was added, and the solution was washed with dilute soda ash solution, forming an emulsion, which was broken by the addition of NaCl. The solvent layer was washed with dilute soda ash solution, and with water, and distilled in vacuo at 178°–184° C./1 mm. The distillate solidified and was recrystallized from methyl ethyl ketone and naphtha. The white crystals, having a melting point of 80° C., were pentachlorophenoxyethyl methacrylate,

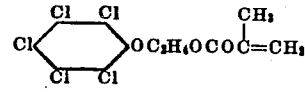

Analysis: Chlorine found, 46.42%.
Theory for chlorine in $C_{12}H_9O_3Cl_5$, 46.90%.

This compound is capable of polymerization which permits application in the form of a monomer with polymerization in situ to render it less soluble.

The above example is illustrative of the preparation of esters by ester interchange.

*Example 5*

155 parts of pentachlorophenoxyethanol, prepared as in Example 1, and 115 parts of lauroyl chloride were mixed and stirred for three hours at 35°–99° C. The mixture was washed with very dilute soda ash solution and was distilled in vacuo at 221°–242° C./2 mm., yielding a pale straw-colored oil which was pentachlorophenoxyethyl laurate,

Analysis: Chlorine found, 35.58%.
Theory for chlorine in $C_{20}H_{27}O_3Cl_5$, 34.64%.

*Example 6*

A mixture of 155 parts of pentachlorophenoxyethanol, prepared as in Example 1, 40 parts of propionic acid, 20 parts of an acidic clay, and 200 parts of toluene was placed in a flask equipped with a mechanical stirrer and a packed fractionating column of a height of two feet. The mixture was stirred for thirty-five hours at 118°–190° C., during which time 116 parts of distillate was removed. The residual mixture was washed with dilute sodium carbonate solution and with water, and was distilled in vacuo. The main fraction came over at 171°–180° C./1 mm. The distillate crystallized and was recrystallized from a mixture of petroleum ether and naphtha, giving white crystals, having a melting point of 51.5°–53° C., of pentachlorophenoxyethyl propionate,

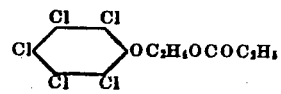

Analysis: Chlorine found, 48.70%.
Theory for chlorine in $C_{11}H_9O_3Cl_5$, 48.43%.

*Example 7*

A solution of 22.5 parts of powdered formamide was made in 40 parts of tert.-butanol and 50 parts of 98% sulfuric acid added thereto during one-half hour while the temperature was held at 5°–22° C. Then 15.5 parts of powdered pentachlorophenoxyethanol was added during three-quarters of an hour with stirring with the temperature held at 20°–40° C. The resulting turbid solution was stirred and warmed for seven hours at 58°–70° C., yielding a gelatinous paste to which 500 cc. of water was added at 75° C. This mixture was cooled to 40° C. to allow crystallization to take place. The crystals were filtered off, washed with water and with dilute sodium carbonate solution, taken up in 200 cc. of naphtha, and the water removed by distillation of an azeotrope. The solvent solution was filtered and petroleum ether added to aid in crystallization. White crystals were obtained which had a melting point of 84.5°–85.5° C. and which were pentachlorophenoxyethyl formate,

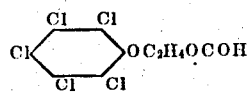

Analysis: Chlorine found, 52.19%.
Theory for chlorine in $C_9H_5O_3Cl_5$, 52.44%.

*Example 8*

A mixture of 155 parts of pentachlorophenoxyethanol and 95 parts of butyric anhydride was stirred and refluxed for four hours at 156°–163° C. It was washed with water and with a 3% sodium carbonate solution and then distilled. The reaction product boiled at 175°–192° C./2 mm. as a pale straw-colored oil, which was identified as pentachlorophenoxyethyl butyrate,

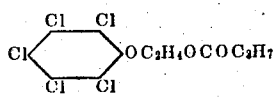

Analysis: Chlorine found, 46.73%.
Theory for chlorine in $C_{12}H_{11}O_3Cl_5$, 46.65%.

By methods similar to those mentioned above, some of which are illustrated in the examples, there may be prepared other esters of the pentahalophenyl ether alcohols. The esters of this invention, as has been mentioned, are particularly valuable as fungicides. They are further characterized by their usefulness as mildewproofing agents of textile fabrics which are well retained by cellulosic fibers even under conditions where leaching takes place. They may be used on fabrics coming into contact with the human skin as they do not produce irritation or cause dermatitis.

For application to surfaces which it is desired to protect from the action of molds, fungicidal compositions may be prepared by dissolving one or more of the esters of this invention in an organic solvent, such as an alcohol, ester, or hydrocarbon including ethyl alcohol, toluene, or naphtha. The resulting composition may be applied as such, or the solution may be emulsified in an aqueous bath. Such emulsions may be formed with the aid of emulsifying or dispersing agents, including sulfonates of hydrocarbons and long-chained alcohols, sulfated long-chained alcohols, sulfated long-chained amides, ether sulfonates, esters of polyglycerol, and other polyhydric alcohols and fatty acids, alkylphenyl polyoxyethylethanols, surface active quaternary ammonium compounds, etc.

The esters of this invention may be applied as the sole finishing agent on textile fibers, yarns, and fabrics, or the esters may be used in conjunction with softening and other finishing agents, waterproofing compositions, or the like.

In evaluating the efficiency of the esters of this invention, there were used test methods which have been accepted in the art. According to such methods, pieces of fabric are impregnated with the fungicidal composition to be tested. Strips thereof are sterilized and placed in a sterile agar culture medium, which is then inoculated with a suspension of spores of a mold, such as *Metarrhizium sp.* or *Chaetomium globosum*. The medium with test strip is incubated for a week, the growth or lack of growth observed, and any effect on the test strip noted.

Pieces of treated fabric may be subjected to leaching in water and the leached piece tested as just described.

For test purposes, 1% solutions of the esters in 50% alcohol were used for the impregnation of unbleached cotton Osnaburg and bleached cotton muslin. The impregnated pieces of cloth were passed between rolls, leaving a weight of impregnating solution in the fabric equal to the weight of the dry fabric. The pieces were then air-dried and strips taken therefrom for tests as described above.

All of the esters of the formula

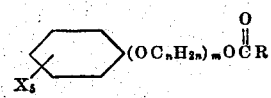

which have been made and tested were found peculiarly effective in preventing growth of molds on cellulose fabrics. Tests are summarized herewith.

Pentachlorophenoxyethyl acetate at 1% permitted no growth and preserved the tensile strength of both unbleached and bleached fabrics. High resistance remained after leaching. Replacement of some or all of the chlorine atoms with bromine preserves the effectiveness of the esters.

Pentachlorophenoxyethoxyethyl acetate prevented all growth on unbleached cotton fabric and preserved the full tensile strength even after leaching.

Pentachlorophenoxyethoxyethoxyethyl acetate inhibited growth on both unbleached and bleached cotton cloth. It was slightly sensitive to leaching, owing to increased solubility from the multiple ether groups.

Pentachlorophenoxyethyl methacrylate and acrylate prevented visible growth on both bleached and unbleached fabric, but were not quite so effective in holding the full tensile strength as esters of saturated acids.

Pentachlorophenoxyethyl laurate permitted no growth on unbleached or bleached cotton fabrics, even after a twenty-four hour leaching in running water.

Excellent resistance to the growth of molds on cotton fabrics was also obtained with the formate, propionate, butyrate, and isobutyrate of pentachlorophenoxyethanol. The pentachlorophenoxyethyl ester of phenoxyacetic acid was found to inhibit growth of molds but permitted slight loss in tensile strength of leached pieces.

Some of the new esters were also taken up in toluene and added to waterproofing compositions of wax and aluminum stearate which were then dispersed in water and applied to cotton duck and found to protect the waterproofed fabric against mildew.

The compounds of this invention also have marked insecticidal properties and may be used to combat infestations of various insects on living plants. Thus, they are parasiticidal in nature. For these uses, the compounds may be taken up on or dispersed with a solid, such as chalk, magnesium carbonate, talc, or other finely divided substances, and applied from an aqueous spray or in the form of a dust.

As illustrations, one part of the acetates of pentachlorophenoxyethanol or of pentachlorophenoxyethoxyethanol intimately admixed with two parts of magnesium carbonate was dispersed in water with a small amount of octylphenoxypolyethoxyethanol as a wetting agent. The admixture was applied to bean plants infested with Mexican bean beetle larvae in aqueous sprays at one part of the toxicant to 100 parts of spray. Good control was obtained in all tests. The same type of test was conducted with pentachlorophenoxyethyl laurate with similar results.

As another method of applying the esters of this invention, they may be taken up in an organic solvent such as pine oil in conjunction with an oil-soluble emulsifying agent, such as sulfonated hydrocarbons from petroleum, and thus dispersed in aqueous sprays and used on plants to control infestation.

I claim:

1. A pentahalophenyl derivative of the formula

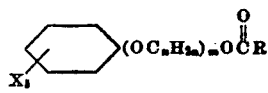

wherein X is a halogen selected from bromine and chlorine, $n$ is an integer from two to three, inclusive, $m$ is an integer from one to three, inclusive, and R is a monovalent group selected from aliphatic radicals and hydrogen.

2. A compound of the formula

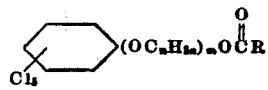

wherein $n$ is an integer from two to three, inclusive, $m$ is an integer from one to three, inclusive, and R is a monovalent group selected from aliphatic radicals and hydrogen.

3. A compound of the formula

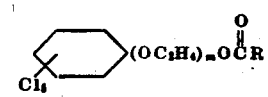

wherein $m$ is an integer from one to three, inclusive, and R is a monovalent group selected from aliphatic radicals and hydrogen.

4. A compound of the formula

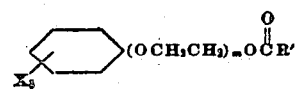

wherein X is a halogen selected from bromine and chlorine, $m$ is an integer from one to three, inclusive, and R' is a monovalent aliphatic radical.

5. A compound of the formula

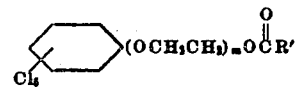

wherein $m$ is an integer from one to three, inclusive, and R' is a monovalent aliphatic radical.

6. A compound of the formula

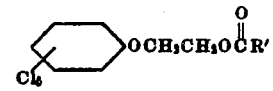

wherein R' is a monovalent aliphatic radical.

7. A compound of the formula

8. A compound of the formula

9. A compound of the formula

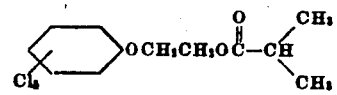

CLINTON W. MacMULLEN.